United States Patent
Yang et al.

(10) Patent No.: US 10,771,963 B2
(45) Date of Patent: *Sep. 8, 2020

(54) METHOD AND BROWSER FOR BROWSING WEB PAGE, AND STORAGE MEDIUM

(71) Applicant: TENCENT TECHNOLOGY (SHENZHEN) COMPANY LIMITED, Shenzhen (CN)

(72) Inventors: Huijiao Yang, Shenzhen (CN); Tingyong Tang, Shenzhen (CN); Bo Hu, Shenzhen (CN); Renfang Liu, Shenzhen (CN); Zhipei Wang, Shenzhen (CN); Ruiyi Zhou, Shenzhen (CN); Xi Wang, Shenzhen (CN); Zhengkai Xie, Shenzhen (CN); Bosen He, Shenzhen (CN); Ying Huang, Shenzhen (CN); Wei Li, Shenzhen (CN); Cheng Feng, Shenzhen (CN); Kai Zhang, Shenzhen (CN); Yulei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 241 days.

This patent is subject to a terminal disclaimer.

(21) Appl. No.: 15/692,612

(22) Filed: Aug. 31, 2017

(65) Prior Publication Data
US 2017/0366967 A1    Dec. 21, 2017

Related U.S. Application Data

(63) Continuation of application No. 14/328,756, filed on Jul. 11, 2014, now Pat. No. 9,788,197, which is a
(Continued)

(30) Foreign Application Priority Data

Mar. 7, 2013   (CN) .......................... 2013 1 0073584

(51) Int. Cl.
H04L 29/06    (2006.01)
H04W 12/02   (2009.01)
(Continued)

(52) U.S. Cl.
CPC ............ *H04W 12/02* (2013.01); *G06F 21/32* (2013.01); *G06F 21/6218* (2013.01); *H04L 67/02* (2013.01); *G06F 2221/2149* (2013.01)

(58) Field of Classification Search
None
See application file for complete search history.

(56) References Cited

U.S. PATENT DOCUMENTS 8,402,011 B1  3/2013 Bodenhamer
9,137,319 B2  9/2015 Xu et al.
(Continued)

FOREIGN PATENT DOCUMENTS

CN   1760868 A    4/2006
CN   1852523 A   10/2006
(Continued)

OTHER PUBLICATIONS

Ameya et al., Restraining Add-On's Behavior in Private Browsing,© 2012, ACM, 6 pages.
(Continued)

*Primary Examiner* — Wasika Nipa
(74) *Attorney, Agent, or Firm* — Anova Law Group, PLLC

(57) ABSTRACT

The present invention discloses a method and a browser for browsing a web page, and a storage medium, and the method comprises: prestoring identity information of an owner user; receiving a web page browsing request from a browsing user, and obtaining the identity information of the browsing user; comparing the identity information of the browsing user with the prestored identity information of the owner
(Continued)

user to determine whether the browsing user is the owner user; browsing a web page in a private browsing mode when the browsing user is determined as the owner user; and browsing a web page in a non-private browsing mode when the browsing user is determined as a non-owner user. By the invention, the privacy of browsing behaviors of the owner user may be effectively protected, and the owner user is enabled to examine browsing behaviors of other non-owner users.

12 Claims, 3 Drawing Sheets

Related U.S. Application Data continuation of application No. PCT/CN2013/089261, filed on Dec. 12, 2013.

(51) Int. Cl.
*G06F 21/32* (2013.01)
*G06F 21/62* (2013.01)
*H04L 29/08* (2006.01)

(56) References Cited

U.S. PATENT DOCUMENTS

| | | | |
|---|---|---|---|
| 2003/0126250 A1 | 7/2003 | Jhanji | |
| 2007/0096870 A1* | 5/2007 | Fisher | E05B 19/0005 340/5.53 |
| 2009/0024741 A1 | 1/2009 | Roach | |
| 2009/0222925 A1* | 9/2009 | Hilaiel | G06F 21/53 726/25 |
| 2009/0235082 A1 | 9/2009 | Garrett | |
| 2011/0167492 A1 | 7/2011 | Ghosh et al. | |
| 2012/0042375 A1 | 2/2012 | Yoo | |
| 2012/0198524 A1 | 8/2012 | Celebisoy | |
| 2012/0240237 A1* | 9/2012 | Kanevsky | G06F 16/957 726/26 |
| 2012/0304306 A1 | 11/2012 | Chamarty et al. | |
| 2013/0167045 A1 | 6/2013 | Xu et al. | |
| 2013/0239220 A1 | 9/2013 | Gjonej et al. | |
| 2013/0305392 A1* | 11/2013 | Bar-El | H04L 9/3263 726/29 |
| 2013/0345981 A1* | 12/2013 | van Os | G01C 21/3626 701/540 |
| 2014/0162598 A1* | 6/2014 | Villa-Real | H04M 1/66 455/411 |
| 2014/0304738 A1 | 10/2014 | Nakaoka et al. | |
| 2015/0143531 A1* | 5/2015 | Gjonej | G06F 21/6245 726/26 |
| 2015/0172925 A1* | 6/2015 | Leppanen | H04W 12/04 726/7 |
| 2015/0254475 A1* | 9/2015 | Bauer | G06F 21/6263 726/27 |

FOREIGN PATENT DOCUMENTS

| | | |
|---|---|---|
| CN | 1967553 A | 5/2007 |
| CN | 101415010 A | 4/2009 |
| CN | 101917404 A | 12/2010 |
| CN | 101951471 A | 1/2011 |
| CN | 102090094 A | 6/2011 |
| CN | 102299804 A | 12/2011 |
| CN | 102622408 A | 8/2012 |
| CN | 102708141 A | 10/2012 |

OTHER PUBLICATIONS

Delac et al., Emerging Security Threats for Mobile Platforms,© 2011, ACM, 6 pages.
Mahmud et al., CSurf: A Context-Driven Non-Visual-Browser,© 2007, ACM, 10 pages.
Penna et al., Challenges of Automating the Detection of Paedophile Activity on the Internet© 2005, IEEE, 15 pages.
Sun et al., Model-directed Web Transactions under Constrained Modalities,© 2006, ACM, 10 pages.
Wang et al., Smartphone Security Challenges,© 2012, IEEE, 7 pages.
The State Intellectual Property Office of the People's Republic of China (SIPO) Office Action 1 for 201310073584.0 dated June 20, 2018 9 Pages (including translation).

* cited by examiner

METHOD AND BROWSER FOR BROWSING WEB PAGE, AND STORAGE MEDIUM

CROSS-REFERENCE TO RELATED APPLICATION

This application is a continuation application of U.S. patent application Ser. No. 14/328,756, filed on Jul. 11, 2014, now U.S. Pat. No. 9,788,197 issued on Oct. 10, 2017. U.S. patent application Ser. No. 14/328,756 know U.S. Pat. No. 9,788,197 issued on Oct. 10, 2017) is a continuation application of PCT Patent Application No. PCT/CN2013/089261, filed on Dec. 12, 2013, which claims the benefit of Chinese Application No. 201310073584.0, filed on Mar. 7, 2013, entitled "METHOD AND DEVICE FOR BROWSING WEB PAGE, AND BROWSER", all of which are incorporated herein by reference in their entirety.

FIELD OF THE INVENTION

The present invention relates to the field of Internet technologies, and in particular, to a method and a browser for browsing a web page, and a storage medium.

BACKGROUND OF THE INVENTION

With the continuous development of communication technologies, mobile terminals (for example, mobile phones) have become the most frequently used Internet accessing terminals in daily life. As different from computers, mobile terminals have a very good portability and hence are likely taken and used by others, which causes the leakage of the privacy of the owner users of the mobile terminals. Therefore, the protection on the privacy of browsing behaviors during web page browsing, for example, the protection on the input history, browsing traces, cookies and files downloaded by the mobile terminal user, becomes indispensable for the owner user of the mobile terminal.

In the prior art, the protection on the privacy of the browsing behaviors of the mobile terminal owner is generally realized via two methods, in one of which, web page browsing is performed in a traceless browsing mode in which the browser of the mobile terminal will not keep any web page browsing record or input history; and in the other one of which, browsing is performed in an incognito mode in which the browser of the mobile terminal will not keep any web page browsing record, input history or cookies, but save bookmarks and the like that are generated in a privacy mode. However, neither of the above two methods can distinguish between browsing users, that is, no matter a browsing user is the owner user or a non-owner user of the mobile terminal, the traceless browsing mode or the incognito mode may be employed for web page browsing. Thus, if a non-owner user uses a mobile terminal to browse a web page in the traceless browsing mode or the incognito mode, the owner user of the mobile terminal cannot look up the browsing record of the non-owner user, and hence cannot judge whether the non-owner user does something harmful, resulting in low security.

SUMMARY OF THE INVENTION

Therefore, embodiments of the invention put forward a method and a browser for browsing a web page, and a storage medium, for the purpose of solving the problem mentioned in the above background of the invention, that is, the existing traceless browsing mode or incognito mode for web browsing cannot distinguish between browsing users, and hence it is not possible to both record browsing behaviors of other non-owner users and effectively protect the privacy of browsing behaviors of the owner user, thus the owner user cannot judge whether the non-owner user does something harmful.

To attain this object, the embodiments of the invention employ the following technical solutions:

A method for browsing a web page, including:
prestoring identity information of an owner user;
receiving a web page browsing request from a browsing user, and obtaining identity information of the browsing user;
comparing the identity information of the browsing user with the prestored identity information of the owner user to determine whether the browsing user is the owner user;
browsing a web page in a private browsing mode when the browsing user is determined as the owner user; and
browsing a web page in a non-private browsing mode when the browsing user is determined as a non-owner user.

Preferably, browsing a web page in a private browsing mode includes:
preserving none of web browsing records, input histories, cookies and buffered files of the browsing user; and
recording a bookmark saved by the browsing user, wherein the bookmark is visible in the private browsing mode only and cannot be exported.

Preferably, the identity information is the fingerprint characteristics information of the user.

Preferably, prestoring identity information of the owner user further includes:
sending a fingerprint input request to the owner user;
collecting a fingerprint image of the owner user, and extracting fingerprint characteristics information from the fingerprint image; and
storing the fingerprint characteristics information as the identity information of the owner user.

Preferably, obtaining the identity information of the browsing user further includes:
sending a fingerprint input request to the browsing user;
collecting and processing a fingerprint image of the browsing user, and extracting fingerprint characteristics information from the fingerprint image of the browsing user; and
taking the fingerprint characteristics information as the identity information of the browsing user.

Preferably, comparing the identity information of the browsing user with the prestored identity information of the owner user to determine whether the browsing user is the owner user further includes:
calculating a matching degree between the identity information of the browsing user and the prestored identity information of the owner user; and
if the matching degree reaches a preset threshold, determining that the browsing user is the owner user; otherwise, determining that the browsing user is a non-owner user.

Correspondingly, the present invention further provide a browser for browsing a web page, including:
a prestoring module used for prestoring identity information of an owner user;
an identity obtaining module used for receiving a web page browsing request from a browsing user and obtaining identity information of the browsing user;
an identity recognition module used for comparing the identity information of the browsing user with the prestored identity information of the owner user and determining whether the browsing user is the owner user; and a browsing module used for browsing a web page in a private browsing mode when the browsing user is determined as the owner user, and browsing a web page in a non-private browsing mode when the browsing user is determined as a non-owner user.

Preferably, browsing a web page in a private browsing mode by the browsing module includes:

preserving none of web browsing records, input histories, cookies and buffered files of the browsing user; and recording a bookmark saved by the user, wherein the bookmark is visible in the private browsing mode only and cannot be exported.

Preferably, the user identity information is fingerprint characteristics information of the user.

Preferably, the prestoring module prestores the identity information of the owner user by:

sending a fingerprint input request to the owner user;

collecting a fingerprint image of the owner user, and extracting the fingerprint characteristics information from the fingerprint image; and storing the fingerprint characteristics information as the identity information of the owner user.

Preferably, the identity obtaining module obtains the identity information of the browsing user by:

sending a fingerprint input request to the browsing user;

collecting and processing a fingerprint image of the browsing user, and extracting the fingerprint characteristics information from the fingerprint image of the browsing user; and taking the fingerprint characteristics information as the identity information of the browsing user.

Preferably, comparing the identity information of the browsing user with the prestored identity information of the owner user and determining whether the browsing user is the owner user by the browsing module further includes:

comparing the identity information of the browsing user with the prestored identity information of the owner user; and if the identity information of the browsing user is consistent with the prestored identity information of the owner user, determining that the browsing user is the owner user; otherwise, determining that the browsing user is a non-owner user.

A storage medium containing computer-executable instructions adapted to perform a method for browsing a web page, wherein the method includes steps of:

prestoring identity information of an owner user;

receiving a web page browsing request from a browsing user, and obtaining identity information of the browsing user;

comparing the identity information of the browsing user with the prestored identity information of the owner user, and determining whether the browsing user is the owner user;

browsing a web page in a private browsing mode when the browsing user is determined as the owner user; and browsing a web page in a non-private browsing mode when the browsing user is determined as a non-owner user.

The present invention has the following beneficial effects that: the identity information of the browsing user is compared with the prestored identity information of the owner user to determine whether the browsing user is the owner user; and when the browsing user is determined as the owner user, a web page is browsed in a private browsing mode, thus the privacy of a browsing behavior of the owner user can be effectively protected; when the browsing user is determined as a non-owner user, a web page is browsed in a non-private browsing mode, thus enabling the owner user to conveniently examine the browsing behaviors of other non-owner users and correctly judge whether other non-owner users do something harmful.

DETAILED DESCRIPTION OF THE EMBODIMENTS

Figure 1:
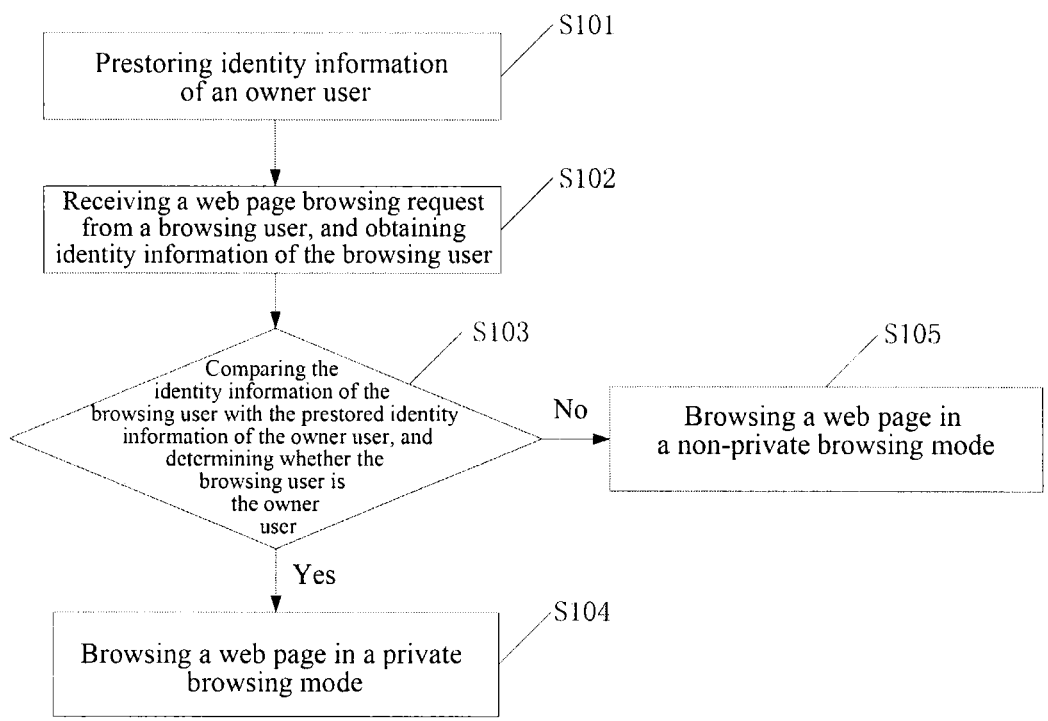
FIG. 1 is a schematic flow chart of a method for browsing a web page according to a first embodiment of the invention.

The invention will be further illustrated in detail below in conjunction with the drawings and embodiments. It may be understood that, the specific embodiments described here are only used for explaining the invention, rather than limiting the scope of the invention. Additionally, it should be further noted that only the parts related to the invention, rather than all contents, are shown in the drawings for the sake of description.

The method and the browser for browsing a web page according to the embodiments of the invention may be operated or integrated on a user equipment installed with the Android operating system (which is an operating system platform for a portable mobile intelligent equipment developed by Google Inc.), the iOS operating system (which is an operating system platform for a portable mobile intelligent equipment developed by Apple Inc.), the Windows Phone operating system (which is an operating system platform for a portable mobile intelligent equipment developed by Microsoft Inc.), etc., and the user equipment may be any one of a mobile phone, a palmtop computer, a tablet computer, etc., and include any combination of a central processing unit, a storage, a switching device, a power supply, a clock signal generator, an image processor, an audio sound processor and the like to realize the method for browsing a web page and the functions of the browser for browsing a web page according to the embodiments of the invention.

FIG. 1 shows a method for browsing a web page according to the first embodiment of the invention.

FIG. 1 is a schematic flow chart of a method for browsing a web page according to the first embodiment of the invention. Referring to FIG. 1, the method includes Steps S101-S105 below.

Step S101: prestoring an owner user identity information, which is preferably the fingerprint characteristics information of the owner user.

Figure 2:
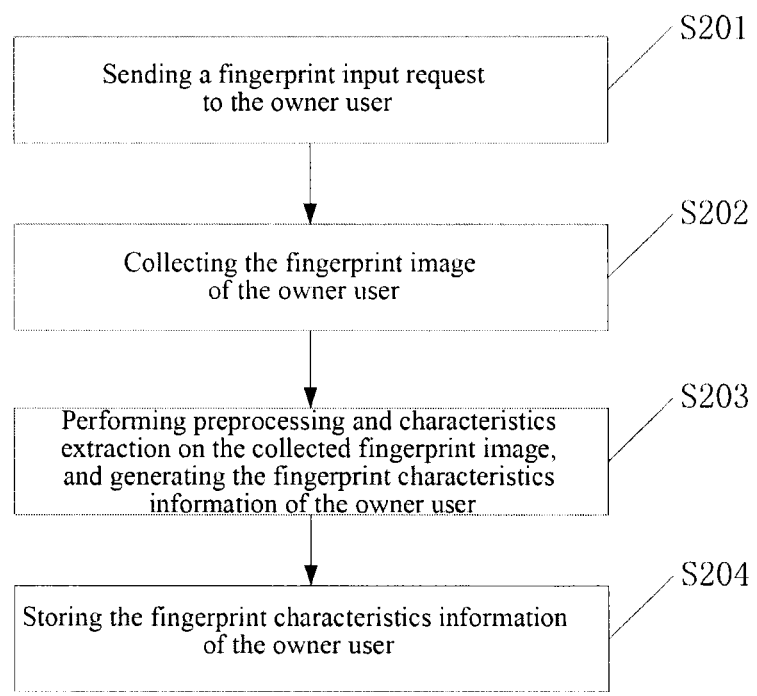
FIG. 2 is a schematic flow chart of prestoring the fingerprint characteristics information of the owner user according to the first embodiment of the invention.

FIG. 2 shows a schematic flow chart of prestoring the fingerprint characteristics information of an owner user according to the first embodiment of the invention in Step S101. Referring to FIG. 2, prestoring the fingerprint characteristics information of the owner user specifically includes Steps S201-S204 below.

Step S201: sending a fingerprint input request to the owner user.

In this embodiment, an option whether to enable a private browsing mode may be added to the browser setup options. When the owner user selects to enable the private browsing mode, a fingerprint input request is sent to the owner user by displaying, on the mobile terminal screen, a prompting message that requests for prestoring the fingerprint characteristics information of the owner user.

Step S202: collecting, by a fingerprint collecting device, a fingerprint image of the owner user.

In this embodiment, the fingerprint collecting device may be any one of an optical fingerprint sensor, a capacitive fingerprint sensor or a Digital Signal Processing (DSP) chip-based fingerprint collecting device. Considering that the optical fingerprint sensor requires for a long enough light path and a large enough size and the DSP chip-based fingerprint collecting device has a complex structure, preferably, the capacitive fingerprint sensor is employed; in this case, when the owner user presses a certain finger thereof on the capacitive fingerprint sensor for 3-5 seconds, the capacitive fingerprint sensor senses and generates a fingerprint image.

Step S203: performing preprocessing and characteristics extraction on the collected fingerprint image, to generate the fingerprint characteristics information of the owner user.

In this embodiment, the preprocessing and characteristics extraction are performed on the collected fingerprint image by using the existing fingerprint characteristics extraction technology, and each extracted characteristics is described by coordinates in the fingerprint image. The preprocessing on the fingerprint characteristics includes fingerprint image normalization, fingerprint image segmentation, fingerprint image binarization and fingerprint image thinning; and the fingerprint characteristics extraction includes structural characteristics extraction, singular point characteristics extraction and pseudo characteristics removal. The center (up and down) and the triangulation points (left and right) of the fingerprint may be chosen as the structural characteristics, and endpoints and branch points of a fingerprint line may be chosen as the singular point characteristics. The fingerprint characteristics information includes the structural characteristics and the singular point characteristics.

Step S204: storing the fingerprint characteristics information generated in step S203 as the owner user identity information.

To this point, the prestoring of the fingerprint characteristics information of the owner user is completed.

Step S102: receiving a web page browsing request from a browsing user, and obtaining identity information of the browsing user, which is preferably the fingerprint characteristics information of the browsing user.

When the web page browsing request is received from the browsing user in Step S102, obtaining the fingerprint characteristics information of the browsing user specifically includes:

sending a fingerprint input request to the browsing user by displaying, on the mobile terminal screen, a prompting message that requests the browsing user to input a fingerprint;

collecting, by a fingerprint collecting device, a fingerprint image of the browsing user; and performing preprocessing and characteristics extraction on the collected fingerprint image by using the existing fingerprint characteristics extraction technology, to generate the fingerprint characteristics information of the browsing user, i.e., the identity information of the browsing user.

When the fingerprint characteristics information of the browsing user is obtained, the collection process by the fingerprint collecting device and the preprocessing and characteristics extraction process on the collected fingerprint image are the same as those in Steps S202-S203 in the above process of prestoring the fingerprint characteristics information of the owner user, and will not be described again here.

Step S103: comparing the identity information of the browsing user with the prestored identity information of the owner user so as to determine whether the browsing user is the owner user; and if so, Step S104 is performed; otherwise, Step S105 is performed.

In Step S103, when the user identity information is the fingerprint characteristics information of the user, the above comparison may include, but is not limited to: calculating the matching degree between the identity information of the browsing user and the prestored identity information of the owner user; and if the matching degree reaches a preset threshold, the browsing user is determined as the owner user; otherwise, the browsing user is determined as a non-owner user. Here, the matching degree refers to the number of the same characteristics between the fingerprint information of the browsing user and the prestored fingerprint information of the owner user.

However, it may readily occur to those skilled in the art that other methods, for example, the existing fingerprint recognition algorithm such as a fuzzy discriminating method, a relaxation method and a two-dimensional clustering method, may also be employed for comparing the identity information of the browsing user with the prestored identity information of the owner user.

Step S104: browsing a web page in a private browsing mode.

In Step S104, browsing a web page in a private browsing mode specifically includes one or more of the following browsing operations:

No web browsing record of the browsing user is preserved; where, the browsing record may include information such as the time and the network address for accessing the web page at Renren website, the QQ space or other web pages of a classmate;

No input history of the browsing user is recorded; for example, the user name and password that are input when a browsing user logs on a ticket subscription system or the network address that is input on a web page address bar will not be recorded;

No cookies are saved;

No buffered file is generated; where, the buffered files refer to pictures, videos or files of other forms that are buffered when a browsing user accesses a web site;

A bookmark saved by the browsing user is recorded, but the bookmark is visible in the private browsing mode only and cannot be exported.

Step S105: browsing a web page in a non-private browsing mode.

In Step S105, browsing a web page in a non-private browsing mode specifically includes one or more of the following browsing operations of: preserving the web browsing record of a browsing user; recording the input history of the browsing user; saving cookies; and generating buffered files.

In this embodiment, the user identity information may also include the voice characteristics information and the face characteristics information of a user and other identity information that can uniquely identify the user, for example, user password. However, considering that a simple password of the owner user is easily deciphered, a complicated password of the owner user is difficult to remember, voice characteristics extraction is unstable because of the possible noisy environment of the owner user or the browsing user, and face characteristics extraction is rather complex, preferably, the fingerprint characteristics information is taken as the user identity information in this embodiment.

Figure 3:
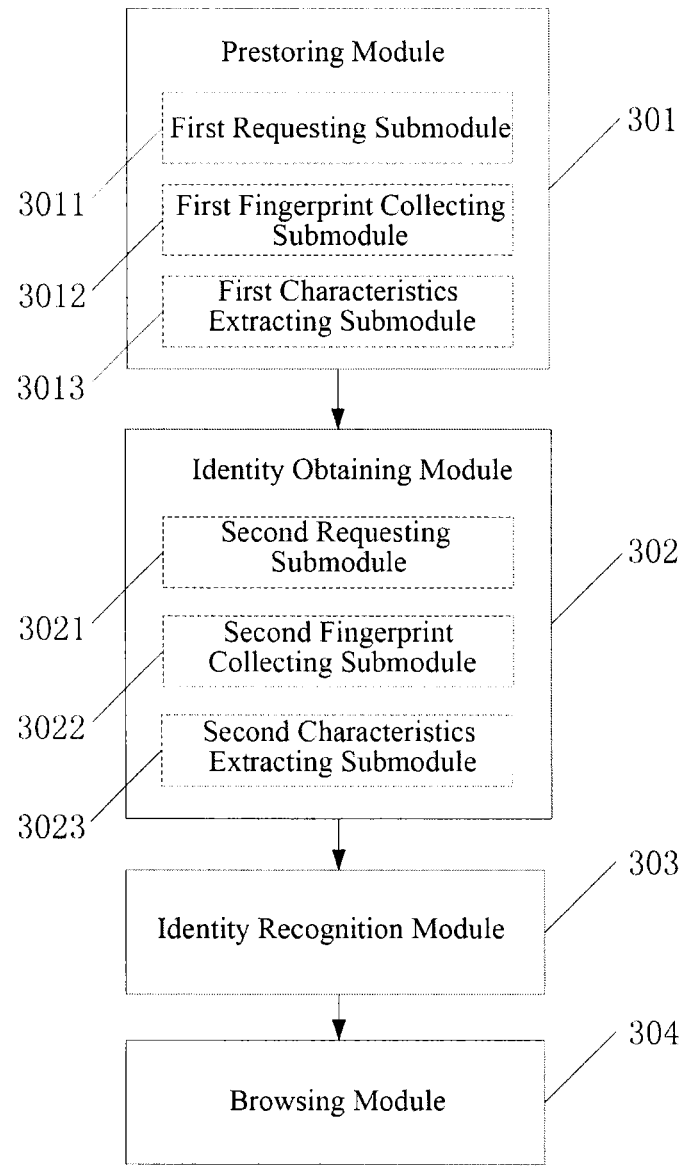
FIG. 3 is a schematic diagram of a browser for browsing a web page according to a second embodiment of the invention.

FIG. 3 shows a browser for browsing a web page according to the second embodiment of the invention.

FIG. 3 is a schematic diagram of a browser for browsing a web page according to the second embodiment of the invention. Referring to FIG. 3, the browser includes: a prestoring module 301 used for prestoring identity information of an owner user; an identity obtaining module 302 used for receiving a web page browsing request from a browsing user and obtaining the identity information of the browsing user; an identity recognition module 303 used for comparing the identity information of the browsing user with the prestored identity information of the owner user and determining whether the browsing user is the owner user; and a browsing module 304 used for browsing a web page in a private browsing mode when the browsing user is determined as the owner user, and browsing a web page in a non-private browsing mode when the browsing user is determined as a non-owner user. Preferably, the user identity information is the fingerprint characteristics information of the user.

When the identity information of the owner user is the fingerprint characteristics information of the owner user, the prestoring module 301 for prestoring the identity information of the owner user may further include:

a first requesting submodule 3011 used for sending a fingerprint input request to the owner user; a first fingerprint collecting submodule 3012 used for collecting, by a fingerprint collecting device, the fingerprint image of the owner user; a first characteristics extracting submodule 3013 used for performing preprocessing and characteristics extraction on the fingerprint image collected by the first fingerprint collecting submodule 3012 to generate the fingerprint characteristics information of the owner user, and storing the generated fingerprint characteristics information as the identity information of the owner user.

In this embodiment, to implement the requesting submodule 3011, it is possible to add an option whether to enable a private browsing mode to the browser setup options; and when the owner user selects to enable the private browsing mode, the requesting submodule 3011 sends a fingerprint input request to the owner user by displaying, on the mobile phone screen, a prompting message that requests for prestoring the fingerprint characteristics information of the owner user.

In this embodiment, the fingerprint collecting device employed by the first fingerprint collecting submodule 3012 may be any one of an optical fingerprint sensor, a capacitive fingerprint sensor or a DSP chip-based fingerprint collecting device; considering that the optical fingerprint sensor requires for a long enough light path and a large enough size and the DSP chip-based fingerprint collecting device has a complex structure, preferably, the capacitive fingerprint sensor is employed. When the owner user presses a certain finger thereof on the capacitive fingerprint sensor for 3-5 seconds, the capacitive fingerprint sensor senses and generates a fingerprint image.

In this embodiment, the first characteristics extracting submodule 3013 may perform the preprocessing and characteristics extraction on the fingerprint image collected by using the existing fingerprint characteristics extraction technology, and each extracted characteristics is described by coordinates in the fingerprint image. The preprocessing on the fingerprint characteristics by the first characteristics extracting submodule 3013 includes fingerprint image normalization, fingerprint image segmentation, fingerprint image binarization and fingerprint image thinning; and the fingerprint characteristics extraction by the first characteristics extracting submodule 3013 includes structural characteristics extraction, singular point characteristics extraction and pseudo characteristics removal; where, the center (up and down) and the triangulation points (left and right) of the fingerprint may be chosen as the structural characteristics, and the endpoints and the branch points of the fingerprint line may be chosen as the singular point characteristics. The fingerprint characteristics information may include the structural characteristics and the singular point characteristics.

When the identity information of the browsing user is the fingerprint characteristics information of the browsing user, the identity obtaining module 302 used for obtaining the identity information of the browsing user may further include: a second requesting submodule 3021 used for sending a fingerprint input request to the browsing user; a second fingerprint collecting submodule 3022 used for collecting, by a fingerprint collecting device, the fingerprint image of the browsing user; and a second characteristics extracting submodule 3023 used for performing preprocessing and characteristics extraction on the fingerprint image collected by the second fingerprint collecting submodule 3022 by using the existing fingerprint characteristics extraction technology, to generate the fingerprint characteristics information of the browsing user as the identity information of the browsing user.

In this embodiment, the second requesting submodule 3021 may send a fingerprint input request to the browsing user by displaying, on the mobile terminal screen, a prompting message that requires the browsing user to input a fingerprint; and collecting the fingerprint image of the browsing user by the second fingerprint collecting submodule 3022 through the fingerprint collecting device is the same as collecting the fingerprint image of the owner user by the first fingerprint collecting submodule 3012 through the fingerprint collecting device, and will not be described again here; the preprocessing and characteristics extraction performed by the second characteristics extracting submodule 3023 on the fingerprint image collected by the second fingerprint collecting submodule 3022 is the same as the preprocessing and characteristics extraction performed by the first characteristics extracting submodule 3013 on the fingerprint image collected by the first fingerprint collecting submodule 3012, and will not be described again here.

When the user identity information is the fingerprint characteristics information of the user, the comparison between the identity information of the browsing user and the prestored identity information of the owner user by the identity recognition module 303 includes, but is not limited to: calculating the matching degree between the identity information of the browsing user and the prestored identity information of the owner user; and if the matching degree reaches a preset threshold, the browsing user is determined as the owner user; otherwise, the browsing user is determined as a non-owner user. Here, the matching degree refers to the number of the same characteristics between the fingerprint information of the browsing user and the prestored fingerprint information of the owner user.

However, it may readily occur to those skilled in the art that the identity recognition module 303 may also compare the identity information of the browsing user with the prestored identity information of the owner user by employing other methods, for example, the existing fingerprint recognition algorithm such as a fuzzy discriminating method, a relaxation method and a two-dimensional clustering method.

When the browsing user is determined as the owner user, the web page browsing in the private browsing mode with the browsing module 304 further includes one or more of the following browsing operations:

No web browsing record of the browsing user is preserved; where, the browsing record may include information such as the time and the network address for accessing the web page at Renren website, the QQ space or other web pages of a classmate;

No input history of the browsing user is recorded; for example, the user name and password that are input when a browsing user logs on a ticket subscription system or the network address that is input on a web page address bar will not be recorded;

No cookies are saved;

No buffered file is generated; where, the buffered files refer to pictures, videos or files of other forms that are buffered when a browsing user accesses a web site;

A bookmark saved by the browsing user is recorded, but the bookmark is visible in the private browsing mode only and cannot be exported.

When the browsing user is determined as a non-owner user, the web page browsing in the non-private browsing mode with the browsing module 304 further includes one or more of the following browsing operations of: preserving the web browsing record of a browsing user; recording the input history of the browsing user; saving cookies; and generating buffered files.

In this embodiment, the user identity information may also include the voice characteristics information and the face characteristics information of a user and other identity information that can uniquely identify the user, for example, user password. However, considering that a simple password of the owner user is easily deciphered, a complicated password of the owner user is difficult to remember, voice characteristics extraction is unstable because of the possible noisy environment of the owner user or the browsing user, and face characteristics extraction is rather complex, preferably, the fingerprint characteristics information is taken as the user identity information in this embodiment.

In the technical solutions put forward in the embodiments of the invention, the browsing user is determined as an owner user or not by comparing the identity information of the browsing user with the prestored identity information of the owner user, so that the browsing users are distinguished; and when the browsing user is an owner user, the web page browsing is conducted in the private browsing mode, so that the privacy of browsing behaviors of the owner user can be effectively protected; when the browsing user is a non-owner user, the web page browsing is conducted in the non-private browsing mode, to enable the owner user to judge, by examining the browsing behaviors of other non-owner users, whether anything harmful has been done by other non-owner users.

All or a part of the contents in the technical solutions provided by the above embodiments may be realized via software programming, and a software program thereof may be stored in a machine-readable storage medium such as a hard disk, a compact disc or a floppy disk for a computer. Therefore, an embodiment of the invention further provides a storage medium containing computer-executable instructions, which are adapted to perform a method for browsing a web page, and the method includes steps of:

prestoring identity information of an owner user;

receiving a web page browsing request from a browsing user, and obtaining identity information of the browsing user;

comparing the identity information of the browsing user with the prestored identity information of the owner user, and determining whether the browsing user is the owner user;

browsing a web page in a private browsing mode when the browsing user is determined as the owner user; and browsing a web page in a non-private browsing mode when the browsing user is determined as a non-owner user.

The above description only shows preferred embodiments of the invention without limiting the invention. All modifications, equivalent substitutions and improvements made within the spirit and principle of the invention should be included in the protection scope of the invention.

What is claimed is:

1. A method for browsing a web page, comprising:
configuring a private browsing mode and a non-private browsing mode for browsing a web page on a user terminal;
receiving a web page browsing request from a browsing user;
displaying on a screen of the user terminal a prompting message requesting the browsing user to input an identity image;
collecting the identity image of the browsing user;
extracting image characteristics information from the identity image of the browsing user for being used as identity information of the browsing user;
comparing the identity information of the browsing user with prestored identity information of an owner user to determine whether the browsing user is the owner user;
browsing a web page in the private browsing mode upon determining the browsing user is the owner user of the user terminal, including: preserving none of browsing records or input histories, and recording a bookmark saved by the browsing user, wherein the bookmark is visible in the private browsing mode only and is unable to be exported; and
browsing the web page in the non-private mode upon determining the browsing user is a non-owner user of the user terminal, including: preserving browsing records and recording input histories, and denying the browsing user from accessing the private browsing mode.

2. The method of claim 1, further comprising:
prestoring the identity information of the owner user, including:
sending an identity input request to the owner user;
collecting the identity image of the owner user, and extracting image characteristics information from the identity image of the owner user; and
storing the image characteristics information of the owner user as the identity information of the owner user.

3. The method of claim 2, wherein, the identity image of the owner user is a fingerprint image of the owner user, and the identity image of the browsing user is a fingerprint image of the browsing user.

4. The method of claim 2, wherein, comparing the identity information of the browsing user with the prestored identity information of the owner user to determine whether the browsing user is the owner user further comprises:
calculating a matching degree between the image characteristics information of the browsing user and the prestored image characteristics information of the owner user; and when the matching degree reaches a preset threshold, determining that the browsing user is the owner user; otherwise, determining that the browsing user is the non-owner user.

5. A user terminal, comprising: a central processing unit; and a browser executed by the central processing unit, wherein the central processing unit is configured to:
   configure a private browsing mode and a non-private browsing mode;
   receive a web page browsing request from a browsing user;
   display on a screen of the user terminal a prompting message requesting the browsing user to input an identity image;
   collect the identity image of the browsing user;
   extract image characteristics information from the identity image of the browsing user for being used as identity information of the browsing user;
   compare the identity information of the browsing user with prestored identity information of an owner user to determine whether the browsing user is the owner user;
   browse a web page in the private browsing mode upon determining the browsing user is the owner user of the user terminal, including: preserving none of browsing records or input histories, and recording a bookmark saved by the browsing user, wherein the bookmark is visible in the private browsing mode only and is unable to be exported; and
   browse the web page in the non-private browsing mode upon determining the browsing user is a non-owner user of the user terminal, including: preserving browsing records and recording input histories, and denying the browsing user from accessing the private browsing mode.

6. The user terminal of claim 5, wherein the central processing unit is further configured to:
   prestore the identity information of the owner user, including:
      sending an identity input request to the owner user;
      collecting the identity image of the owner user, and extracting image characteristics information from the identity image of the owner user; and
      storing the image characteristics information of the owner user as the identity information of the owner user.

7. The user terminal of claim 6, wherein, the identity image of the owner user is a fingerprint image of the owner user, and the identity image of the browsing user is a fingerprint image of the browsing user.

8. The user terminal of claim 6, wherein the central processing unit is further configured to:
   calculate a matching degree between the image characteristics information of the browsing user and the prestored image characteristics information of the owner user; and
   when the matching degree reaches a preset threshold, determine that the browsing user is the owner user; otherwise, determine that the browsing user is the non-owner user.

9. A computer-readable storage device containing computer-executable instructions adapted to perform a method for browsing a web page, wherein the method comprises:
   configuring a private browsing mode and a non-private browsing mode for browsing a web page;
   receiving a web page browsing request from a browsing user;
   displaying on a screen of the user terminal a prompting message requesting the browsing user to input an identity image;
   collecting the identity image of the browsing user;
   extracting image characteristics information from the identity image of the browsing user for being used as identity information of the browsing user;
   comparing the identity information of the browsing user with prestored identity information of an owner user to determine whether the browsing user is the owner user;
   browsing a web page in the private browsing mode upon determining the browsing user is the owner user of the user terminal, including: preserving none of browsing records or input histories, and recording a bookmark saved by the browsing user, wherein the bookmark is visible in the private browsing mode only and is unable to be exported; and
   browsing the web page in the non-private browsing mode upon determining the browsing user is determined as a non-owner user of the user terminal, including: preserving browsing records and recording input histories, and denying the browsing user from accessing the private browsing mode.

10. The computer-readable storage device of claim 9, wherein the method further comprises:
    prestoring the identity information of the owner user, including:
       sending an identity input request to the owner user;
       collecting the identity image of the owner user, and extracting image characteristics information from the identity image of the owner user; and
       storing the image characteristics information of the owner user as the identity information of the owner user.

11. The computer-readable storage device of claim 10, wherein, the identity image of the owner user is a fingerprint image of the owner user, and the identity image of the browsing user is a fingerprint image of the browsing user.

12. The computer-readable storage device of claim 10, wherein, comparing the identity information of the browsing user with the prestored identity information of the owner user to determine whether the browsing user is the owner user further comprises:
    calculating a matching degree between the image characteristics information of the browsing user and the prestored image characteristics information of the owner user; and
    when the matching degree reaches a preset threshold, determining that the browsing user is the owner user; otherwise, determining that the browsing user is non-owner user.

* * * * *